(No Model.) 2 Sheets—Sheet 1.

J. KNOOP.
HARVESTING MACHINE.

No. 374,601. Patented Dec. 13, 1887.

Witnesses:
Samuel Knoop
A. S. Niley

Inventor:
Josiah Knoop (No Model.) 2 Sheets—Sheet 2.

J. KNOOP.
HARVESTING MACHINE.

No. 374,601. Patented Dec. 13, 1887.

Witnesses:
Samuel Knoop
A. F. Wiley

Inventor:
Josiah Knoop

UNITED STATES PATENT OFFICE.

JOSIAH KNOOP, OF CASSTOWN, OHIO.

HARVESTING-MACHINE.

SPECIFICATION forming part of Letters Patent No. 374,601, dated December 13, 1887.

Application filed April 27, 1885. Renewed May 27, 1887. Serial No. 239,559. (No model.)

*To all whom it may concern:*

Be it known that I, JOSIAH KNOOP, of Casstown, Miami county, Ohio, have invented certain new and useful Improvements in Harvesting-Machines, of which the following is a specification.

My invention relates to improved mechanism for delivering the grain from the platform-conveyer to a table at a higher level for the purpose of being bound thereon while being delivered from the machine.

The improvements are intended more particularly for use in what are commonly known as "half-low-down harvesting and binding machines," and I have shown them thus applied in the accompanying drawings.

Figure 1:
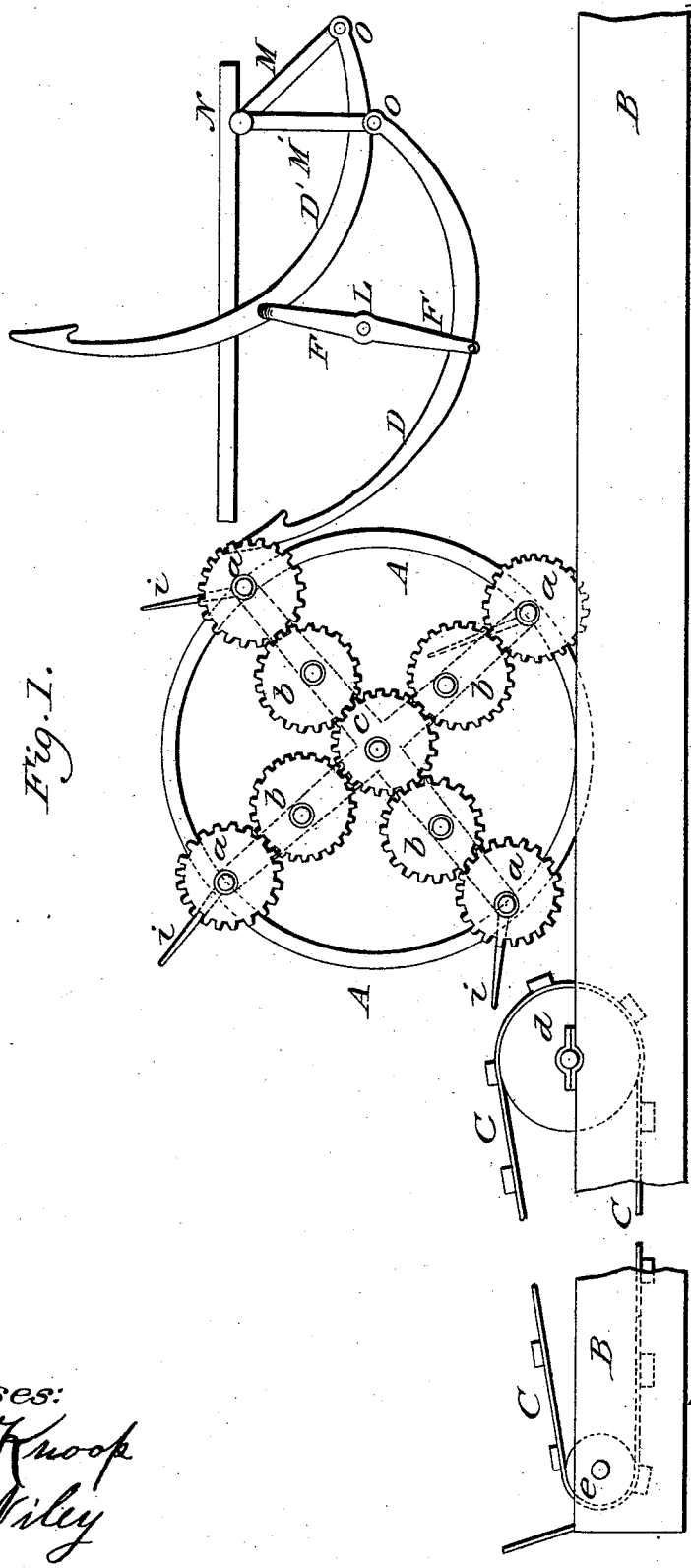
Figure 2:
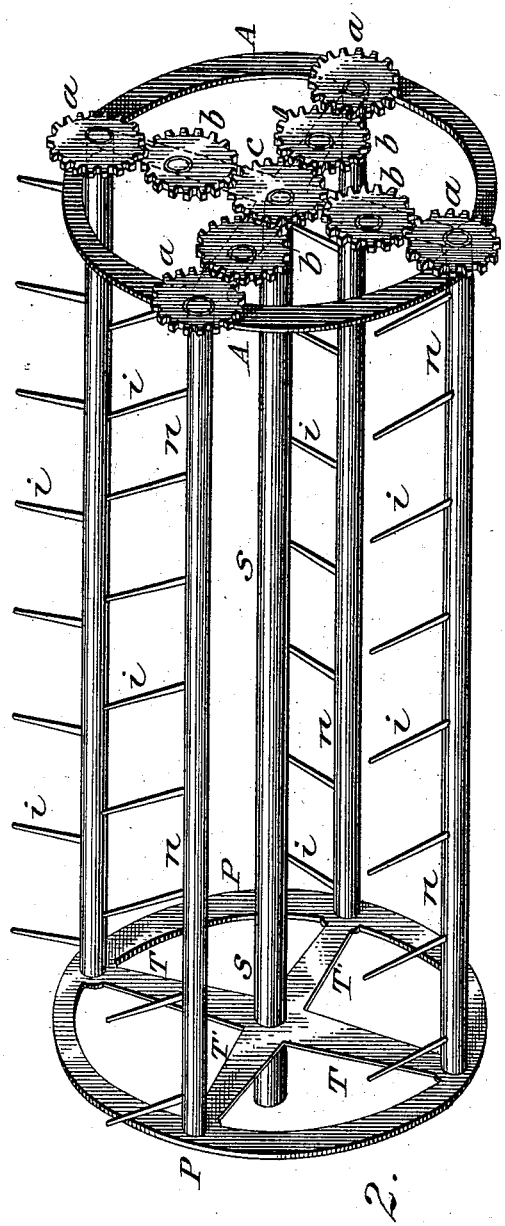
Figure 3:
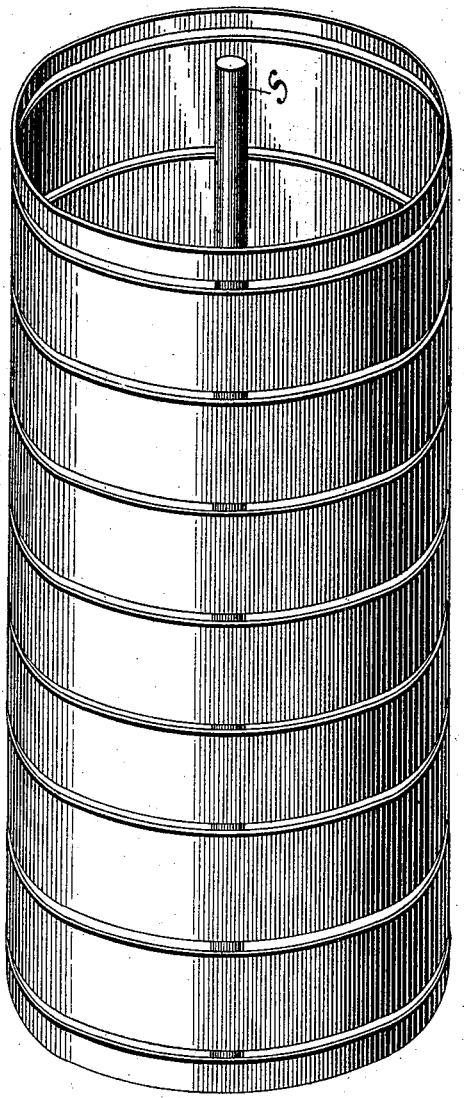

Referring to the accompanying drawings, Figure 1 represents a rear elevation of my rotary elevator and adjacent parts arranged in position between the platform-conveyer and the binding-table. Fig. 2 is a perspective view of the rotary elevator or reel detached. Fig. 3 is a perspective view of the shield or housing within which the elevator proper revolves.

Referring to the drawings, B represents the rear timber or sill of the main frame; C, an endless conveyer-apron, commonly known as the "platform-conveyer," by which the grain falling from the cutters is delivered at the inner end of the platform.

N represents the elevated table to which it is desired to transfer the grain from the conveyer C. For this purpose I mount between the platform-conveyer and the table a rotary elevator—such as represented in Figs. 1 and 2—consisting of two end wheels or disks, A and P, mounted on and revolved by a central shaft, S, as follows: A shaft, S, extending horizontally in a fore-and-aft direction and seated in suitable bearings, is provided at its ends with two wheels or disks, A and P, fixed thereon. These disks give support to a series of rock-shafts, $n$, journaled therein near the periphery parallel with the central shaft, and each provided with a series of rake-teeth, $i$.

At one end each rock-shaft is provided with a circular supporting-pinion, $a$, mounted eccentrically thereon. Each of these pinions engages a circular eccentrically-pivoted pinion, $b$, mounted on the wheel A. The series of pinions $b$ engage a central driving-pinion, $c$, around which they revolve and from which they receive motion. The driving-pinion $c$ is fixed in position upon the frame or other support eccentrically to the shaft S, the result of this arrangement being that when the reel is revolved the toothed shafts are carried therewith and rocked in their bearings therein in such manner that the teeth $i$ are projected toward the lower end of the platform-conveyer to receive the grain therefrom and retained in their projected position as they rise until they are carried rearward sufficiently far to deliver the grain to the binding-table.

I am aware that a series of toothed rock-shafts have been mounted in revolving heads and operated through intermediate pinions from a central driving-pinion; and I am also aware that in a hay-tedding machine an eccentric driving-pinion has been connected by a peculiar pinion to eccentric-pinions on the rock-shafts, the arrangement being such that the rake-teeth projected at the lower side were quickly retracted, their projection continuing for less than one-fourth of the revolution of the head by which they were carried. My construction differs therefrom in the important particular that the pinions are formed and arranged to hold the teeth in their projected or operative positions through more than one-half the revolution of the reel. This arrangement of the parts to maintain the long-continued operation of the teeth upon the grain is of the essence of my invention, and is highly important, in that it enables the teeth to be presented in such relation to the platform-conveyer that they will take a firm hold upon the grain and carry the same without fail upward and backward to the receiving-table.

Another advantage resulting from my construction lies in the fact that the rake-teeth $i$ gradually change their position in the course of their action in the manner best adapted to retain their hold upon the grain. As will be seen in Fig. 1, they are first presented in a substantially horizontal position to receive the grain, and gradually turned to a vertical position as they move to the rear, their position at the moment of delivering the grain being such that they will withdraw endwise therefrom.

In connection with my revolving reel I employ a surrounding shield—such as shown in Fig. 3—slotted to permit the teeth to extend outward therethrough. This shield may be formed of wood, metal, or other suitable material, bent into suitable form and secured to the main frame or other appropriate support.

In the drawings I have shown, in connection with the binding-table N, ordinary packer-arms, D D', such as are used in Appleby binders, these arms receiving motion, as usual, from crank-arms F F' on the shaft L, and are guided at their rear ends by vibrating pivoted links M M'. These devices form no part of my invention. The reel may receive motion through gearing of any suitable character, and the details may be modified at will, provided it is adapted to give support to the reel-shaft.

Having thus described my invention, what I claim is—

1. In a harvesting-machine, and in combination with the platform-conveyer and the receiving-table, the intermediate grain-elevator, consisting of the revolving wheels or disks, the toothed rock-shafts therein, the eccentric-pinions thereon, the circular eccentric-pinions $b$, and the stationary circular eccentric driving-pinions $c$, said parts constructed and arranged, as described, to maintain the rake-teeth in a projected position for a long-continued period.

2. In an elevator for a grain-harvesting machine, the combination of the revolving wheels or disks, the toothed shaft mounted therein, the stationary eccentric driving-pinion, and the eccentric-pinions connecting the latter with the rake-shafts, said parts constructed and arranged, as described, to project the teeth horizontally at or near their lowest position and turn them gradually to a vertical position as the shafts are elevated.

JOSIAH KNOOP.

Witnesses:
 HENRY JACKSON,
 H. H. HAVENS.